(12) United States Patent
Slapak

(10) Patent No.: US 10,641,385 B2
(45) Date of Patent: May 5, 2020

(54) METHOD FOR CONTROLLING A GEARBOX, A GEARBOX AND A VEHICLE PROVIDED WITH SUCH A GEARBOX

(71) Applicant: Scania CV AB, Södertälje (SE)

(72) Inventor: Dieter Slapak, Södertälje (SE)

(73) Assignee: SCANIA CV AB (SE)

(*) Notice: Subject to any disclaimer, the term of this patent is extended or adjusted under 35 U.S.C. 154(b) by 135 days.

(21) Appl. No.: 15/763,548

(22) PCT Filed: Oct. 3, 2016

(86) PCT No.: PCT/SE2016/050936
§ 371 (c)(1),
(2) Date: Mar. 27, 2018

(87) PCT Pub. No.: WO2017/061927
PCT Pub. Date: Apr. 13, 2017

(65) Prior Publication Data
US 2018/0274671 A1  Sep. 27, 2018

(30) Foreign Application Priority Data

Oct. 6, 2015 (SE) ........................ 1551283

(51) Int. Cl.
*F16H 3/12* (2006.01)
*F16H 61/04* (2006.01)
(Continued)

(52) U.S. Cl.
CPC ......... *F16H 61/0403* (2013.01); *F16H 3/006* (2013.01); *F16H 3/091* (2013.01);
(Continued)

(58) Field of Classification Search
CPC ... B60W 10/113; B60W 30/19; F16H 3/0915; F16H 61/0403; F16H 3/091; F16H 3/006;
(Continued)

(56) References Cited

U.S. PATENT DOCUMENTS

| 6,196,944 | B1  | 3/2001  | Schmitz ........................ 475/303 |
| 2002/0088289 | A1* | 7/2002 | Bowen .................... F16H 3/006 74/331 |
| 2002/0088290 | A1* | 7/2002 | Bowen .................... F16H 3/006 74/335 |
| 2005/0221943 | A1* | 10/2005 | Kuhstrebe ............... F16H 3/006 475/207 |
| 2008/0064554 | A1  | 3/2008 | Tsukada et al. .............. 475/218 |

(Continued)

FOREIGN PATENT DOCUMENTS

| DE | 4436526 A1 | 10/1995 |
| DE | 19950679 A1 | 4/2001 |

(Continued)

OTHER PUBLICATIONS

International Search Report dated Dec. 9, 2016 in corresponding PCT International Application No. PCT/SE2016/050936.

(Continued)

*Primary Examiner* — Roger L Pang
(74) *Attorney, Agent, or Firm* — Ostrolenk Faber LLP

(57) ABSTRACT

A method for controlling a gearbox (2) that includes a main gearbox (6) provided with a splitter shaft (16) and a main shaft (14), connectable to a power source (4). The splitter shaft (16) is connected to a lay shaft (22) by at least a first and a second splitter gear pair (42, 45). The main shaft (14) is connected to a lay shaft (22) by at least a first gear pair (60). The method includes a) preparing a shifting of gear in the gearbox (2) by transferring essentially the same speed and torque between the splitter and the main shafts (16, 14), and b) shifting gear in the gearbox (2).

12 Claims, 5 Drawing Sheets

(51) Int. Cl.
*F16H 61/688* (2006.01)
*F16H 3/00* (2006.01)
*F16H 37/04* (2006.01)
*F16H 61/70* (2006.01)
*F16H 3/091* (2006.01)
*B60W 10/113* (2012.01)
*B60W 30/19* (2012.01)

(52) U.S. Cl.
CPC ............ *F16H 3/12* (2013.01); *F16H 37/046* (2013.01); *F16H 61/688* (2013.01); *F16H 61/70* (2013.01); *F16H 61/702* (2013.01); *B60W 10/113* (2013.01); *B60W 30/19* (2013.01); *F16H 3/0915* (2013.01); *F16H 2003/123* (2013.01); *F16H 2061/0411* (2013.01); *F16H 2200/0078* (2013.01); *F16H 2200/2064* (2013.01); *F16H 2200/2094* (2013.01)

(58) Field of Classification Search
CPC .. F16H 3/12; F16H 61/688; F16H 2061/0411; F16H 2003/123
USPC ........................................... 74/330, 331, 335
See application file for complete search history.

(56) References Cited

U.S. PATENT DOCUMENTS

| 2014/0038769 A1 | 2/2014 | Kaltenbach et al. ......... 475/302 |
| 2014/0165755 A1 | 6/2014 | Morris et al. ................... 74/330 |
| 2015/0267810 A1 | 9/2015 | Kaltenbach ................... 475/209 |
| 2017/0101105 A1* | 4/2017 | Karpenman ........ F16H 61/0403 |
| 2018/0266553 A1* | 9/2018 | Slapak ............... F16H 61/0403 |

FOREIGN PATENT DOCUMENTS

| DE | 10 2006 036 758 A1 | 2/2008 |
| DE | 10 2009 030 783 A1 | 2/2010 |
| DE | 10 2012 015 434 A1 | 2/2014 |
| GB | 2506601 A | 4/2014 |
| GB | 2522706 A | 8/2015 |
| WO | WO 01/55620 A1 | 8/2001 |
| WO | WO 2014/116176 A1 | 7/2014 |
| WO | WO 2015/052389 A1 | 4/2015 |

OTHER PUBLICATIONS

Written Opinion dated Dec. 9, 2016 in corresponding PCT International Application No. PCT/SE2016/050936.
Extended European Search Report dated Apr. 23, 2019 in corresponding European Application No. 16853988.0.

* cited by examiner

| Shaft | Synch | Gear From>To | S1 Coupled | S1 Neutral | S2 Coupled | S2 Neutral | S3 Coupled | S3 Neutral | S4 Coupled | S4 Neutral | S5 Coupled | S5 Neutral | S6 Coupled | S6 Neutral | S7 Coupled | S7 Neutral | S8 Coupled | S8 Neutral | S9 Coupled | S9 Neutral | S10 Planet Carr | S10 Neutral | S10 Ring Wheel | S11 Ring Wheel | S11 Planet Carr | S12 Forward | S12 Neutral | S12 Rearward |
|---|---|---|---|---|---|---|---|---|---|---|---|---|---|---|---|---|---|---|---|---|---|---|---|---|---|---|---|---|
| AB | 0 | Neutral | x | | x | | x | | | x | | x | | x | x | | | | | x | | x | | | x | | | x |
| Neu | P1+P2 | 1+3 | x | | x | | x | | | x | | x | | x | x | | x | | | x | | | | x | | x | | | x |
| B | 0 | 1>3 | x | | x | | x | | | x | | x | | x | x | | x | | | x | | | | x | | x | | | x |
| A | P2 | 3>3 | x | | x | | | x | | x | | x | | | x | | x | | | x | | | | x | | x | | | x |
| B | P1 | 3>5 | x | | x | | x | | | x | | x | x | | | x | x | | | x | | | | x | | x | | | x |
| A | P2 | 5>7 | | x | x | | x | | | x | x | | x | | | x | x | | | x | | | | x | | x | | | x |
| B | P1 | 7>9 | | x | x | | x | | | x | x | | x | | | x | x | | | x | | | | x | | x | | | x |
| A | P2 | 9>11a | | x | x | | x | | x | | | x | | x | | x | x | | x | | | | x | | x | | | x |
| A | P1 | 9>11b | x | | x | | x | | x | | x | | | x | x | | x | | x | | | x | | | x | | | x |
| A | P2 | 9>11c | x | | x | | x | | x | | x | | | x | x | | x | | x | | | x | | | x | | | x |
| B | P1 | 11>13 | x | | x | | | x | | x | | x | | x | x | | | x | x | | | x | | | x | | | x |
| A | P2 | 13>13 | x | | x | | x | | x | | | x | | x | x | | | x | x | | | x | | | x | | | x |
| B | P1 | 13>14a | x | | x | | x | | x | | | x | | x | x | | | x | x | | | x | | | x | | | x |
| B | P2 | 13>14b | x | | x | | x | | x | | | x | | x | x | | | x | x | | | x | | x | | | x | |

Fig. 4

METHOD FOR CONTROLLING A GEARBOX, A GEARBOX AND A VEHICLE PROVIDED WITH SUCH A GEARBOX

CROSS-REFERENCE TO RELATED APPLICATIONS

The present application is a 35 U.S.C. §§ 371 national phase conversion of PCT/SE2016/050936, filed Oct. 3, 2016, which claims priority of Swedish Patent Application No. 1551283-3, filed Oct. 6, 2015, the contents of all of which are incorporated herein by reference. The PCT International Application was published in the English language.

FIELD OF THE INVENTION

The present invention relates to a method for controlling a gearbox, a gearbox, a vehicle provided with such a gearbox, a computer program to control such a gearbox and a computer program product comprising program code according to the appended claims.

BACKGROUND

In vehicles, and especially for heavier vehicles such as trucks, an auxiliary gearbox, also called range gearbox, is often connected to a main gearbox to double the number of gears. Such an auxiliary gearbox usually includes a planetary gear, which has a low gear and a high gear, whereby the main gearbox shift facilities can be divided into a low range gear position and a high range gear position. In low range gear, a downshift takes place through the planetary gear, and, in the high range gear, the gear ratio is 1:1 in the planetary gear.

The range gearbox is usually provided between the main gearbox and a propeller shaft coupled to the drive wheels of the vehicle. The range gearbox is accommodated in a gearbox housing and comprises an input shaft coupled to the main gearbox and an output shaft coupled to the propeller shaft. Between the input shaft and the output shaft, the planetary gear is disposed. The planetary gear usually comprises three main components, which are rotatably arranged relative to each other. The three main components include a sun gear, a planet carrier with planet gears and a ring gear. With knowledge of the number of teeth of the sun gear and the ring gear the relative speed of the three components can be determined during operation. In a range gearbox, the sun gear can be rotatably connected to the input shaft, a number of planet gears engage said sun gear, and are rotatably mounted on the planet carrier, which is fixedly connected to the output shaft, and an axially displaceable ring gear which surrounds and engages the planet gears.

In a known range gearbox, the low range gear position and the high range gear position are obtained by displacing the ring gear axially between the low range gear position, in which the ring gear is rotationally locked relative to the gearbox housing, and the high range gear position in which the ring gear is rotatable relative to the gearbox housing where the ring gear, the planet gears and the sun gear rotate as a common unit. The planetary gear comprises two coupling rings arranged on each side of the ring gear and two synchronizing rings arranged on each side of the ring gear. The synchronizer rings are arranged to provide a synchronous shift.

The document WO0155620 discloses a synchronization device in a planetary gear. The planetary gear includes a sun gear, a planet carrier and a ring gear. The sun gear is rotatably connected with the input shaft. A number of planet gears engage the sun gear and are rotatably mounted on the planet carrier, which is connected to the output shaft. An axially displaceable ring gear surrounds and meshes with the planet gears. Low and high gear are obtained by displacing the ring gear axially between the low range gear and the high range gear.

These synchronization means are subject to wear and are costly to repair. If the range gearbox is to transmit a large torque, the synchronization devices must be enlarged, which results in increased weight, increased space requirements and an increased moment of inertia.

There are range gearboxes in which the synchronization devices are replaced with coupling sleeves provided with splines. By controlling the transmission to synchronous speed between the two components to be connected it is possible to displace axially the coupling sleeve along the two components in order to connect the two components. When the components are to be detached, the transmission is controlled so that torque balance occurs between the components and the coupling sleeve is not transmitting torque. It then becomes possible to move the coupling sleeve along the components in order to disengage them from each other.

The document U.S. Pat. No. 6,196,944 shows a planetary gear comprising a sun gear, a planet carrier with planet gears and a ring gear. The sun gear may be connected to the input shaft by means of a coupling sleeve in a low range gear position and disengaged from the input shaft in a high range gear position. In the high range gear position the input shaft is connected to the planet carrier by means of the same coupling sleeve. The ring gear is firmly connected to a gearbox housing. The known planetary gear is arranged in an auxiliary gearbox, having only two gear positions.

The document U.S. Pat. No. 6,196,944 shows a gearbox for motor vehicles comprising a planetary gear comprising a first and a second sleeve acting on the planet carrier, the ring gear, the gearbox housing and the output shaft. The first and second sleeves are controlled as one connected unit.

A gearbox provided with a double clutch system (also known as dual clutch system) comprises two or more input shafts, each connected to a clutch. The power from an energy source such as an internal combustion engine can be guided from one of the input shafts to the other by means of the clutch system, so that the power flow can be guided from one transmission shaft to a transmission shaft running in parallel, via gears meshing together.

Document US2014/0038769 A1 discloses a transmission using two transmission shafts running on axes parallel to each other, which can be coupled together. The transmission comprises a range gear.

However, when connecting a range gearbox to a main gearbox provided with a double clutch system it is difficult or even impossible to find a power flow through the transmission so that shifting gears can take place without an interruption of torque. A gearbox in which shifting of gears can take place without interruption of torque makes it possible to shift gears very fast, save fuel and provide comfort to the driver and the passengers of the vehicle in which the gearbox is arranged.

The space available for the powertrain in a vehicle is often limited. If the powertrain comprises several components, such as a combustion engine, a gearbox and a range gearbox, the design must be compact. At the same time, the components of the powertrain must be designed with dimensions that can absorb the necessary forces and torques.

A large number of gear steps are required in certain types of vehicles, in particular in heavy duty vehicles such as trucks and buses. The large number of gear steps is necessary when vehicles are loaded. However, when unloaded all gear steps are not necessary and the large number of gear steps can make it difficult to accelerate the vehicle fast enough when the vehicle is unloaded. When using all gear steps for accelerating the vehicle also the sound from the gearbox increases.

When the number of components of the gearbox increases, the gearbox also must be enlarged to absorb large forces and torques, which arise in such heavy vehicles. Thus, the size and the weight of the gearbox increases.

High demands are placed also on the reliability and the dependability, for the components of the powertrain. Wear influences the reliability and the lifetime of the gearbox.

SUMMARY OF THE INVENTION

There is a need to develop a method for controlling a gearbox that shifts gears without interruption in torque, which reduces wear of the components in the gearbox, which reduces sound from the gearbox, and which provides for an increased acceleration of a vehicle in which the gearbox is mounted. Also, there is a need to develop a gearbox with a compact design.

One object of the invention is to provide a method for controlling a gearbox that shifts gears without interruption in torque.

A further object of the invention is to provide a method for controlling a gearbox that reduces wear of the components in the gearbox.

A further object of the invention is to provide a method for controlling a gearbox that reduces sound from the gearbox.

A further object of the invention is to provide a method for controlling a gearbox, which provides for an increased acceleration of a vehicle in which the gearbox is mounted.

A further object of the invention is to provide a gearbox with a compact design.

These objects are achieved with a method for controlling a gearbox, a gearbox, a vehicle, a computer program for controlling a gearbox, and a computer program product for controlling a gearbox according to the independent claims.

A method according to the invention relates to controlling a gearbox that shifts gears without interruption in torque, reduces wear of the components in the gearbox, reduces sound from the gearbox, and provides for an increased acceleration of a vehicle in which the gearbox is mounted. Also, the invention allows for a gearbox which has a compact design.

Shifting of gears is performed in two steps, so that every second gear is shifted. In order to shift gears in two steps, the gearbox is prepared by transferring essentially the same speed and torque between the splitter and the main shafts. Thereafter, the gearbox is shifted in two steps without interruption in torque.

According to an embodiment of the invention, the speed between the splitter shaft and the main shaft is synchronized by means of activating a synchronizing element. This provides for shifting gears without interruption in torque and for transferring essentially the same speed and torque between the splitter and the main shafts.

Preferably, the coupling elements comprise a ring shaped sleeve that is displaced axially between its engaged and disengaged positions. The sleeve concentrically surrounds at least a part of the rotating components in the gearbox essentially and is displaced between the engaged and disengaged positions by means of a force provider. In this way, a compact design with low weight and low cost of manufacture is obtained.

The gearbox may be provided with a number of gear pairs that comprise gears that can be mechanically engaged and disengaged on shafts within the gearbox. In this way, a number of fixed gear steps are obtained, between which it is possible to shift gears without interruption in torque. The gear wheels that can be engaged on the shafts in the gearbox also result in a compact design with high reliability and high dependability.

Each one of the gear pairs has a gear ratio that is adapted to the desired driving performance of the vehicle. It is appropriate that the gear pair with the highest gear ratio, relative to the other gear pairs, is engaged when the lowest gear has been selected.

In order to disengage a gear from a shaft or from another gear, synchronizing elements are controlled such that torque balance is prevalent between the gear and the shaft or between the gears. When torque balance has been achieved, the sleeve is displaced such that the gear and the shaft, or the gears, are no longer mechanically connected to each other.

BRIEF DESCRIPTION OF THE DRAWINGS

Preferred embodiments of the invention will be described as an example below with reference to attached drawings, of which:

FIG. 4 shows a shift pattern for shifting the gearbox according to the invention.

DETAILED DESCRIPTION OF PREFERRED EMBODIMENTS OF THE INVENTION

Figure 1:
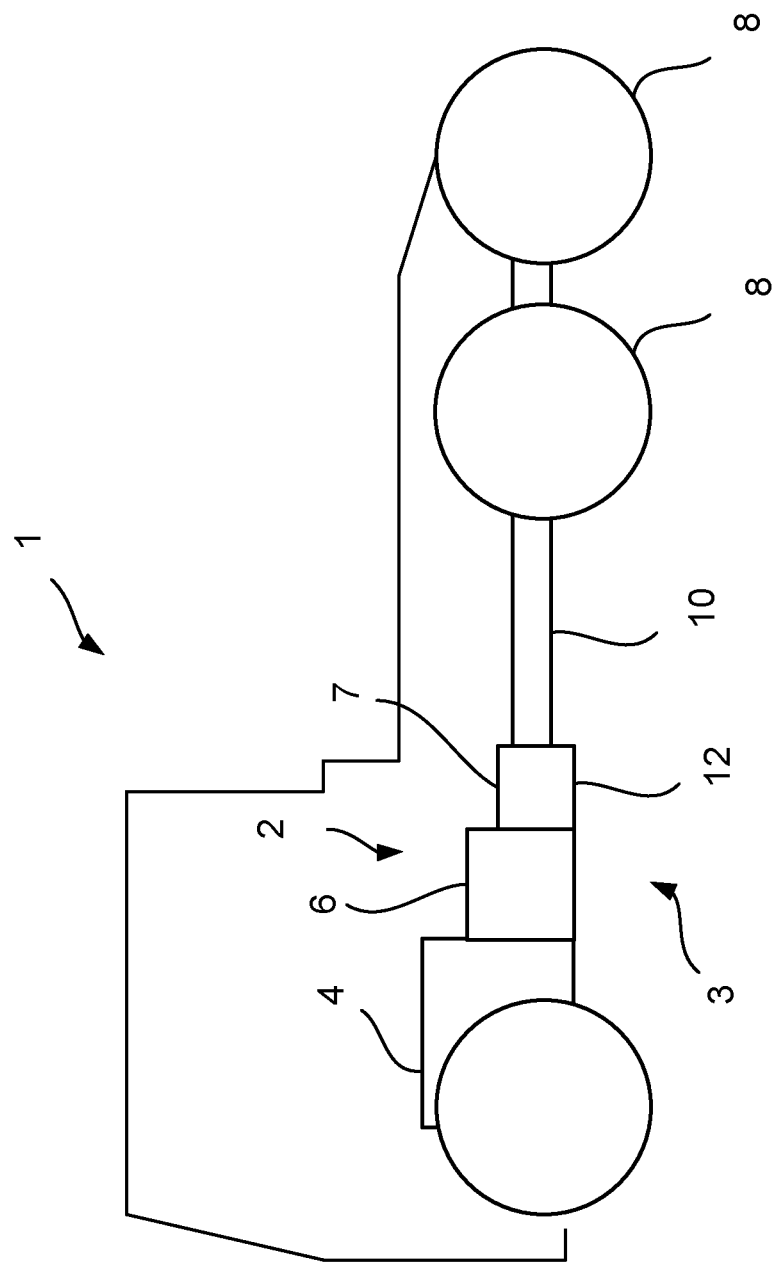
FIG. 1 shows a schematic side view of a vehicle with a gearbox according to the invention.

FIG. 1 shows schematically a vehicle 1 in a side view with a gearbox 2 according to the invention. The gearbox 2 is included in a powertrain 3, which comprises an internal combustion engine 4, a main gearbox 6, a range gearbox 7 and a propeller shaft 10. The combustion engine 4 is coupled to the main gearbox 6, which in turn is connected to the range gearbox 7. The range gearbox 7 is further connected to the drive wheels 8 of the vehicle 1 via the propeller shaft 10.

Figure 2:
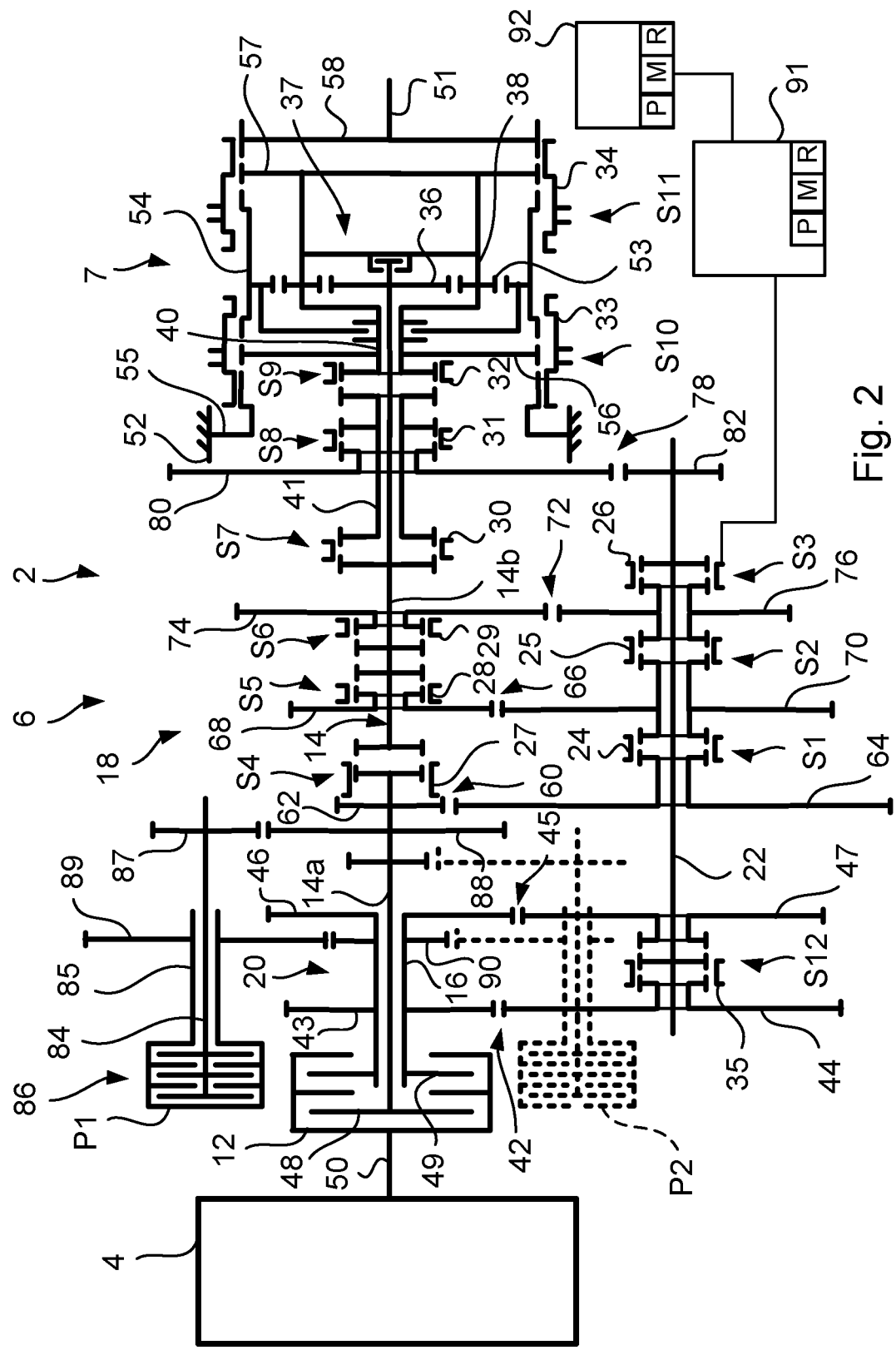
FIG. 2 shows a schematic side view of the gearbox according to the invention.

FIG. 2 shows a schematic sectional view of a gearbox 2 of the present invention. The gearbox 2 is especially suitable for heavy duty vehicles. The gearbox 2 according to the invention comprises the main gearbox 6 and the range gearbox 7. The engine 4 is coupled to the gearbox 2 by means of a double clutch 12. The main gearbox 6 is provided with first and second synchronizing elements P1, P2, which are coupled to a main shaft 14 and a splitter shaft 16 in the gearbox 2. The main gearbox 6 comprises a main group 18 of gear pairs and a splitter group 20 of gear pairs upstream of the main group 18. The range gearbox 7 is arranged downstream of the main gearbox 6.

The main group 18 of gears of the main gearbox 6 comprises a first gear pair 60 that is arranged between the main shaft 14 and a lay shaft 22. The first gear pair 60 comprises a first gear wheel drive 62 and a first gear wheel 64, which interact with each other. A second gear pair 66 is arranged between the main shaft 14 and the lay shaft 22. The second gear pair 66 comprises a second gear wheel drive 68 and a second gear wheel 70, which interact with each other. A third gear pair 72 is arranged between the main shaft 14 and a lay shaft 22. The third gear pair 72 comprises a third gear wheel drive 74 and a third gear wheel 76, which interact with each other. A fourth gear pair 78 is arranged between the main shaft 14 and the lay shaft 22. The fourth gear pair 78 comprises a fourth gear wheel drive 80 and a fourth gear wheel 82, which interact with each other.

The first gear wheel drive 62 and the fourth gear wheel 82 are firmly attached to the main shaft 14 and the lay shaft 22, respectively, such that they cannot rotate relative to their respective shafts.

The lay shaft 22 extends essentially parallel to the main shaft 14. The second, the third and the fourth gear wheel drives 68, 74, 80 are arranged in bearings at the main shaft 14. The first, the second and the third gear wheels 64, 70, 76 are arranged in bearings at the lay shaft 22. The first gear wheel drive 62 interacts with the first gear wheel 64, the second gear wheel drive 68 interacts with the second gear wheel 70, the third gear wheel drive 74 interacts with the third gear wheel 76 and the fourth gear wheel drive 80 interacts with the fourth gear wheel 82.

The first, the second and the third gear wheels 64, 70, 76 can be engaged with and disengaged from each other with the aid of the first, and the second coupling elements S1 and S2.

The third gear wheel 76 can be individually engaged with and disengaged from the lay shaft 22 with the aid of the third coupling element S3. The second and the third gear wheel drives 68, 74 can be individually engaged with and disengaged from the main shaft 14 with the aid of the fifth and the sixth coupling elements S5, S6. The fourth gear wheel drive 80 can be individually engaged with and disengaged from a collar 41, which surrounds the main shaft 14. A fourth coupling element S4 is arranged to engage with and disengage from a first and a second part 14a, 14b of the main shaft 14. The coupling elements S1 to S3 and S5 to S8 are preferably constituted by sections equipped with splines at the gear wheels 64, 70, 76 and the gear wheel drives 68, 74, 80, and the main and the lay shafts 14, 22, respectively, which interact with the first to the third and the fifth to the eighth coupling sleeves 24-26, 28-31, which interact mechanically with the sections equipped with splines at the gear wheels 64, 70, 76 and the gear wheel drives 68, 74, 80, respectively, and the main and the lay shafts 14, 22, respectively. A seventh coupling element S7 comprises a seventh coupling sleeve 30 for connecting the collar 41 with the main shaft 14 and for connecting and disconnecting a sun wheel 36 and a planet carrier 38 of a planetary gear 37 in the range gearbox 7. When in the disengaged condition, a relative rotation can arise between the gear wheels and the gear wheel drives 64, 70, 76, 68, 74 and 80, and the side and the main shafts 14, 22, respectively. The coupling element S4 is preferably also constituted by sections equipped with splines designed at an end part of the respective first and second parts 14a, 14b of the main shaft 14, which interact with a fourth coupling sleeve 27, which interact mechanically with the end parts of the respective first and second parts 14a, 14b of the main shaft 14. The coupling elements S1 to S8 may be constituted also by friction couplings. A ninth coupling element S9 comprising a ninth sleeve 32 is arranged to connect and disconnect a planet carrier shaft 40 from the collar 41.

The splitter group 20 of gears of the main gearbox 6 comprises a first splitter gear pair 42 that is arranged between the splitter shaft 16 and the lay shaft 22. The first splitter gear pair 42 comprises a first splitter gear wheel drive 43 and a first splitter gear wheel 44, which interact with each other. A second splitter gear pair 45 is arranged between the splitter shaft 16 and the lay shaft 22. The second splitter gear pair 45 comprises a second splitter gear wheel drive 46 and a second splitter gear wheel 47, which interact with each other.

The lay shaft 22 extends essentially parallel to the splitter shaft 16. The first and the second splitter gear wheel drives 43, 46 are attached to the splitter shaft 16. The first and the second splitter gear wheels 44, 47 are arranged in bearings at the lay shaft 22.

The first and the second splitter gear wheels 44, 47 can be individually engaged with and disengaged from the lay shaft 22 with the aid of a twelfth, or splitter, coupling element S12, comprising a twelfth sleeve 35, which is preferably constituted with splines interacting with sections equipped with splines arranged at the split gear wheels 44, 47 and the lay shaft 22, respectively. Preferably, the twelfth coupling element S12 is provided with a common coupling sleeve 35. When in the disengaged condition, a relative rotation can arise between the split gear wheels 44, 47 and the split gear wheel drives 43, 46 and the lay shaft 22. The twelfth coupling element S12 may be constituted also by a friction coupling.

The main shaft 14 extends inside a central bore in the splitter shaft 16. Thus, the main and the splitter shafts 14, 16 are arranged coaxially. It is, however, also possible to arrange the main shaft 14 parallel to the splitter shaft 16.

The double clutch 12, which comprises a first and a second clutch element 48, 49, is arranged between an engine shaft 50 and the main and the splitter shafts 14, 16. The first clutch element 48 is connected to the main shaft 14 and the second clutch element 49 is connected to the splitter shaft 16. Torque generated by the engine 4 is guided from the engine shaft 50 to the main and the splitter shafts 14, 16 by means of the double clutch 12, so that the torque can be guided from the engine shaft 50 to an output shaft 51 of the range gearbox 7, via the different gears. The double clutch 12 is preferably a wet double clutch, but may also be implemented as a dry double clutch depending on the torque to be transmitted.

The range gearbox 7 aims to double the number of gear opportunities. The range gearbox 7 is surrounded by a gearbox housing 52. The range gearbox 7 comprises the planetary gear 37, which has a low and a high gear, so that the switching capability of the main gearbox 6 can be divided into a low range gear position and a high range gear position. In a first gear position corresponding to the low range gear position, a downshift takes place in the planetary gear 37. In the high range gear position, the gear ratio is 1:1 in the planetary gear 37. In FIG. 2, the range gearbox 7 is shifted into a neutral position where the gearbox 7 does not transmit any torque from the input shaft 50 to the output shaft 51.

The planetary gear 37 comprises three main components which are rotatably arranged in relation to each other, namely a sun gear 36, a planet carrier 38 and a ring gear 54. A number of planet gears 53 are rotatably arranged with bearings on the planet carrier 38. With knowledge of the number of teeth of the sun gear 36 and the ring gear 54, the relative gear ratio of the three components can be determined. The sun gear 36 is rotatably connected to the main shaft 14 and the planet gears 53 engage the sun gear 36. The ring gear 54 surrounds and engages the planet gears 53.

A tenth coupling element S10, which comprises an axially displaceable tenth coupling sleeve 33, is in the first gear position arranged to connect the gearbox housing 52 with the ring gear 54, and, in the second gear position, arranged to disconnect the gearbox housing 52 from the ring gear 54. An eleventh coupling element S11, which comprises an axially displaceable eleventh coupling sleeve 34, is in the first and the second gear positions arranged to interconnect the planet carrier 38 with the output shaft 51.

The tenth coupling element S10, which comprises the axially displaceable tenth coupling sleeve 33, is preferably provided with first splines on an inner surface arranged to interact with the corresponding first splines arranged on the ring gear 54 and on the periphery of a projection 55, which is fixedly connected to the gearbox housing 52. The first splines on the axially displaceable tenth coupling sleeve 33 are also arranged to cooperate with corresponding first splines arranged on a first sprocket 56. Corresponding first splines on the axially displaceable tenth coupling sleeve 33 are also arranged to cooperate with corresponding first splines arranged on the planet carrier 38. Corresponding first splines disposed on the planet carrier 38 are arranged on the periphery of the first sprocket 56, which is mounted on the planet carrier 38.

An eleventh coupling element S11, which comprises an axially displaceable eleventh coupling sleeve 34, is on an inner surface provided with second splines, which are arranged to cooperate with corresponding second splines arranged on the ring gear 54, the planet carrier 38 and the output shaft 51. The corresponding second splines arranged on the planet carrier 38 are formed on the periphery of a second sprocket 57, which is mounted on the planet carrier 38. The corresponding second splines provided on the output shaft 51 are formed on the periphery of a third sprocket 58, which is mounted on the output shaft 51.

The low gear in the gearbox 2 is obtained by axially displacing the tenth coupling sleeve 33, so that the ring gear 54 is connected to the gearbox housing 52. The axial displacement of the tenth and the eleventh coupling sleeves 33, 34 can be provided by means of shift forks (not disclosed) partly arranged in an outside circumferential groove in the respective coupling sleeve 33, 34.

The range gearbox 7 according to the invention functions as follows when shifting from the first to the second gear position, that is, from the low range gear position to the high range gear position. In the low range gear position, the tenth coupling sleeve 33 has been shifted to a position to connect the ring gear 54 with the gearbox housing 52. Thus, when the range gearbox 7 is in the low range gear position, a downshift takes place through the planetary gear 37. The shifting operation from the low range gear position to the high range gear position is made by disconnecting the ring gear 54 from the gearbox housing 52 by means of the tenth coupling sleeve 33. Also, in the high range position, the planet carrier 38 is connected to the main shaft 14 by means of the seventh coupling element S7. In order to again shift gear to the low range gear position, the tenth coupling sleeve 33 is shifted to connect the ring gear 54 with the gearbox housing 52.

The eleventh coupling sleeve 34 may be shifted into a third gear position in which the ring gear 54 is coupled to the output shaft 51, which is coupled to the propeller shaft 10 of the vehicle 1. In this gear position, corresponding to a reverse gear, the axially displaceable tenth coupling sleeve 33 is displaced to a position where the planet carrier 38 is connected to the gearbox housing 52.

Figure 3:
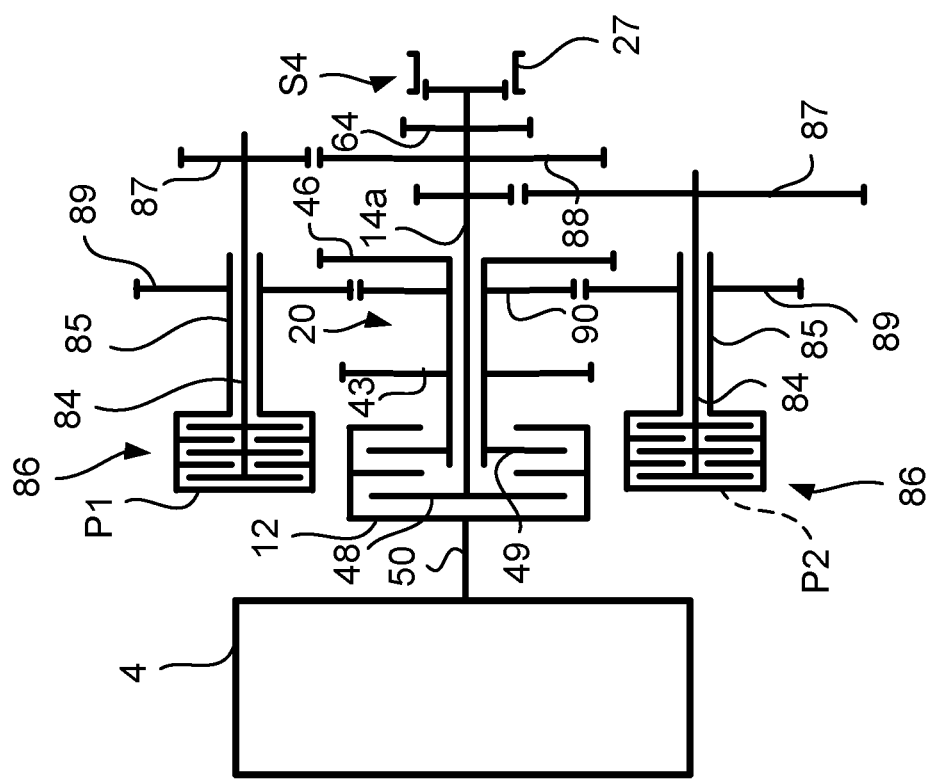
FIG. 3 shows a view in detail of the synchronizing elements in FIG. 2.

The gearbox 2 is provided with a first and a second synchronizing element P1, P2 both connected to the main shaft 14 and to the splitter shaft 16 via gears of different ratios. The synchronizing elements P1, P2 are arranged to reduce or increase the speed of the main shaft 14 and the splitter shaft 16 in order to synchronize the speed of gears and shafts before shifting gears. The speed of the main shaft 14 and the splitter shaft 16 can be reduced or increased by means of the synchronizing elements P1, P2 since both the main shaft 14 and the splitter shaft 16 are connected to each synchronizing element P1, P2 and since the synchronizing elements P1, P2 are connected to the main shaft 14 and to the splitter shaft 16 via gears of different ratios. In FIG. 2, the second synchronizing element P2 is depicted with broken lines because the second synchronizing element P2 is hidden behind the splitter group 20 and the lay shaft 22. For reasons of clarity the lay shaft 22 has been removed in FIG. 3 and therefore the second synchronizing element P2 is clearly shown. Each synchronizing element P1, P2 is provided with a first and a second brake shaft 84, 85, which are connected to brake elements 86, such as friction brakes. A first synchronizing gear 87 on each synchronizing element P1, P2 is arranged to the first brake shaft 84, which interacts with a corresponding first synchronizing gear drive 88 on the splitter shaft 16. A second synchronizing gear 89 on each synchronizing element P1, P2 is arranged to the second brake shaft 85, which interacts with a corresponding second synchronizing gear drive 90 on the main shaft 14.

When shifting gears, the power path from engine 4 to the output shaft 51 will be transferred through the main shaft 14 or the splitter shaft 16. Shifting of gears takes place on the shaft 14/16 that does not transfer torque. When the next gear is shifted and prepared on that shaft 14/16, which does not transfer torque, the double clutch 12 is activated so that the power path from the engine 4 to the output shaft 51 will be transferred to the other shaft 14/16 on which the next gear is prepared.

The coupling elements S1, S2, . . . S12 are connected to a control unit 91 through the relevant coupling sleeves 24-35. Preferably, these components are activated and deactivated by electrical signals from the control unit 91. Preferably the coupling sleeves 24-35 are displaced by force providers (not shown in the drawings) such as hydraulically or pneumatically powered cylinders. It is possible to displace the coupling sleeves 24-35 also by electrically powered force providers.

FIG. 4 shows a shift pattern of the gearbox 2 according to the invention. The shift pattern comprises fifteen forward gears, which can be shifted and implemented without an interruption of torque through the gearbox 2. The neutral position in the shift pattern in FIG. 4 represents the position of the coupling elements S1, S2, . . . S12 in FIG. 2. Thus, the gearbox in FIG. 2 is in the neutral position and no torque is transferred from the engine 4 to the output shaft 51 of the gearbox 2.

From the shift pattern in FIG. 4 it is evident that the gear shifting is performed in two steps, so that every second gear is shifted when shifting from the first gear to the thirteenth gear. Shifting gears in two steps reduces wear of the components in the gearbox 2, reduces sound from the gearbox 2, and provides for an increased acceleration of the vehicle 1 in which the gearbox 2 is mounted. From a neutral position, the gearbox 2 is shifted to the first gear and the main shaft 14 is connected to the engine 4 through the double clutch 12. The gearbox 4 is prepared to be shifted to the third gear, and this preparation of gears is related to the main shaft 14, which is disconnected from the engine 4 through the double clutch 12. When shifting from the first gear to the third gear, the main shaft 14 is disconnected from the engine 4 through the double clutch 12 and the splitter shaft 16 is connected to the engine 4 through the double clutch 12. Such shifting from the first gear to the third gear is done without interruption in torque. However, when shifting from the third gear to the fifth gear the torque and speed must be transferred from the splitter shaft 16 to the main shaft 14, for example, from shaft A to shaft B, which is depicted in the shift pattern in FIG. 4. The transfer of torque and speed from shaft A, i.e. the splitter shaft 16, to shaft B, i.e. the main shaft 14, before shifting to the fifth gear must be done in order to prevent interruption in torque. This transfer step is depicted 3>3 in the shift pattern in FIG. 4.

When preparing a shifting of gear in the gearbox 2 by transferring the speed and torque between the splitter and the main shafts 16, 14, the speed between the splitter shaft 16 and the main shaft 14 is synchronized by means of activating one of the synchronizing elements P1, P2. Which of the synchronizing elements P1, P2 should be activated depends on the speed of the splitter shaft 16 and the main shaft 14. If the speed of the main shaft 14 is lower than the speed of the splitter shaft 16, the synchronizing element P1, P2 having the gear ratio to accelerate the main shaft 14 should be activated. When transferring the speed and torque from the main shaft 14 to the splitter shaft 16 and preparing a shifting from the third gear to the fifth gear in the gearbox 2, the second synchronizing element P2 should be activated, which is evident from the shift pattern in FIG. 4.

The gearbox 2 may also be shifted in other types of shift patterns. Therefore, transferring the speed and torque from the splitter shaft 16 to the main shaft 14 may be needed when preparing a shifting of gears. In such a situation, possibly, the first synchronizing element P1 should be activated, which depends on the speed of the splitter shaft 16 and the main shaft 14.

Figure 5:
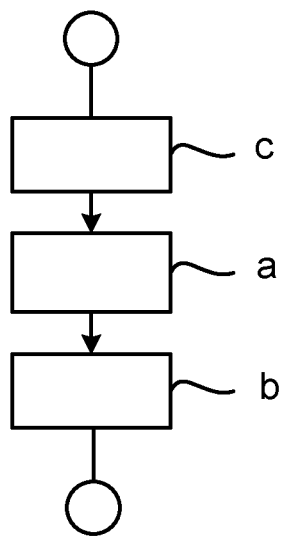
FIG. 5 shows a flow diagram concerning a method of controlling the gearbox according to the invention.

FIG. 5 shows a flow diagram of a method of controlling the gearbox 2 according to the invention. The gearbox 2 comprises a main gearbox 6 provided with at least two input shafts in the form of a splitter shaft 16 and a main shaft 14, which are connectable to a power source 4. The splitter shaft 16 is connected to a lay shaft 22 by means of at least a first and a second splitter gear pair 42, 45. The main shaft 14 is connected to a lay shaft 22 by means of at least a first gear pair 60.

The method according to the invention includes the steps:
a) preparing a shifting of gear in the gearbox 2 by transferring essentially the same speed and torque between the splitter and main shafts 16, 14;
b) shifting gear in the gearbox 2.

Preferably, the method includes a further step c) of synchronizing the speed between the splitter shaft 16 and the main shaft 14 by means of activating a synchronizing element P1, P2 before step a).

Preferably, the two synchronizing elements P1, P2 are connected to both the splitter shaft 16 and the main shaft 14, by means of brake gears 87, 89 with different ratios, and each synchronizing element P1, P2 is provided with brake elements 86.

Preferably, there are at least first and second splitter gear pair 42, 45, a first splitter gear wheel 44, and a second splitter gear wheel 47, respectively, which are connectable to the lay shaft 22 by means of a splitter coupling element S12, and the at least first gear pair 60 comprises a first gear wheel 64, which is connectable to the lay shaft 22 by means of a first coupling element S1, and in step b) the shifting of gear in the gearbox 2 is performed by connecting the first splitter gear wheel 44 or the second splitter gear wheel 47 to the lay shaft 22 by means of the splitter coupling element S12, and by connecting the first gear wheel 64 to the lay shaft 22 by means of the first coupling element S1.

Preferably, in step a), the speed and torque from the main shaft 14 are transferred to the splitter shaft 16.

Preferably, in step b), the gear in the gearbox 2 is shifted by disconnecting the main shaft 14 from the power source 4 and the splitter shaft 16 is connected to the power source 4.

Preferably, in step b), the disconnection of the main shaft 14 from the power source 4 and the connection of the splitter shaft 16 to the power source 4 are made by means of a double clutch 12.

Preferably, in step a), the speed and the torque from the splitter shaft 16 are transferred to the main shaft 14.

Preferably, in step b), changing gear in the gearbox 2 is made by disconnecting the splitter shaft 16 from the power source 4 and connecting the main shaft 14 to the power source 4.

Preferably, in step b), the disconnection of the splitter shaft 16 from the power source 4 and the connection of the main shaft 14 to the power source 4 are made by means of a double clutch 12.

Preferably, a first part 14*a* of the main shaft 14 is connected to a second part 14*b* of the main shaft 14 by means of a fourth coupling element S4.

The electronic control unit 91 is coupled to the different components in the main gearbox 6, the range gearbox, the combustion engine 4 and the double clutch 12 to achieve the gear shifting above. Preferably, a number of (not shown) speed sensors in the main gearbox 6, the range gearbox 7, the combustion engine 4 and the double clutch 12 may be connected to the control unit 91. Another computer 92 may also be connected to the control unit 91. The control unit 91 may be a computer with appropriate software for this purpose. The control unit 91 and/or the computer 92 may comprise a computer program P, which can include routines to control the gearbox 2 of the invention. The program P may be stored in an executable form or compressed form in a memory M and/or in a read/write memory. Preferably, there is provided a computer program product comprising a program code stored on a computer readable medium for performing the gear shifting above, when said program is run on the control unit 91 or another computer 92 connected to the control unit 91. Said code may be non-transitory and stored in said computer readable medium.

The specified components and distinctive features that are specified above may be combined between the different specified embodiments within the framework of the invention.

The invention claimed is:
1. A method for controlling a gearbox, the gear box including
a main gearbox provided with at least two input shafts, including a splitter shaft and a main shaft, which are connectable to a power source,
the splitter shaft being connected to a lay shaft by at least a first and a second splitter gear pair,
the main shaft being connected to a lay shaft by at least a first gear pair;
a first synchronizing element connected to the splitter shaft with a first brake gear and connected to the main shaft with a second brake gear, the first brake gear and the second brake gear having different ratios;

a second synchronizing element connected to the splitter shaft with a third brake gear, and connected to the main shaft with a fourth brake gear, the third brake gear and the fourth brake gear having different ratios;

the method comprising the following steps:

a) synchronizing speeds of the splitter shaft and the main shaft with the first synchronizing element or the second synchronizing element to prepare a shifting of gear in the gearbox for facilitating a shift of gears in two steps without interruption in torque by transferring essentially the same speed and torque from the main shaft to the splitter shaft, or from the splitter shaft to the main shaft; and b) without interrupting torque, shifting gear in the gearbox after step a).

2. The method according to claim 1, c) wherein the synchronizing the speeds of the splitter shaft and the main shaft is performed by activating a synchronizing element before step a).

3. The method according to claim 2, wherein each synchronizing element is provided with brake elements.

4. The method according to claim 1, wherein the first and the second splitter gear pair each comprises a first splitter gear wheel and a second splitter gear wheel, which are connectable to the lay shaft by a splitter coupling element, and the at least first gear pair comprises a first gear wheel, which is connectable to the lay shaft by a first coupling element, and, in step b), shifting gear in the gearbox is performed by connecting the first splitter gear wheel or the second splitter gear wheel to the lay shaft by the splitter coupling element, and by connecting the first gear wheel to the lay shaft by the first coupling element.

5. The method according to claim 1, wherein, when in step a), the speed and torque are transferred from the main shaft to the splitter shaft, in step b), gear is shifted in the gearbox by disconnecting the main shaft from the power source and connecting the splitter shaft to the power source.

6. The method according to claim 5, wherein, in step b), the disconnection of the main shaft from the power source and the connection of the splitter shaft to the power source are made by a double clutch.

7. The method according to claim 1, wherein, when in step a), the speed and torque are transferred from the splitter shaft to the main shaft, in step b), gear is shifted in the gearbox by disconnecting the splitter shaft from the power source and connecting the main shaft to the power source.

8. The method according to claim 7, wherein, in step b), the disconnection of the splitter shaft from the power source and the connection of the main shaft to the power source are made by a double clutch.

9. The method according to claim 1, wherein a first part of the main shaft is connected to a second part of the main shaft by a fourth coupling element.

10. A gearbox comprising: a main gearbox provided with at least two input shafts, comprising a splitter shaft and a main shaft, which are connectable to a power source, wherein the splitter shaft is connected to a lay shaft by at least a first and a second splitter gear pair, wherein the main shaft is connected to a lay shaft by at least a first gear pair; a first synchronizing element connected to the splitter shaft with a first brake gear and connected to the main shaft with a second brake gear, the first brake gear and the second brake gear having different ratios; a second synchronizing element connected to the splitter shaft with a third brake gear, and connected to the main shaft with a fourth brake gear, the third brake gear and the fourth brake gear having different ratios; the gearbox being controllable by the method of claim 1.

11. A vehicle, wherein the vehicle comprises a gearbox according to claim 10.

12. A computer product comprising non-transitory program code stored on a medium that can be read by a computer in order to carry out the method steps according to claim 1, when said program code is executed by an electronic control unit or another computer connected to the electronic control unit.

* * * * *